United States Patent
Nakamura et al.

(10) Patent No.: US 6,792,498 B2
(45) Date of Patent: Sep. 14, 2004

(54) MEMORY SYSTEM WITH MECHANISM FOR ASSISTING A CACHE MEMORY

(75) Inventors: Tomohiro Nakamura, Hachioji (JP); Hidetaka Aoki, Hadano (JP)

(73) Assignee: Hitachi, Ltd., Tokyo (JP)

( * ) Notice: Subject to any disclaimer, the term of this patent is extended or adjusted under 35 U.S.C. 154(b) by 140 days.

(21) Appl. No.: 09/923,339

(22) Filed: Aug. 8, 2001

(65) Prior Publication Data

US 2002/0099912 A1 Jul. 25, 2002

(30) Foreign Application Priority Data

Jan. 22, 2001 (JP) .................................. 2001-012608

(51) Int. Cl.[7] .............................................. G06F 12/00
(52) U.S. Cl. .......................... 711/3; 711/117; 711/118; 711/119; 711/128; 711/144
(58) Field of Search ................. 711/117, 118, 711/119, 128, 133, 144, 156, 3

(56) References Cited

U.S. PATENT DOCUMENTS

| | | | | |
|---|---|---|---|---|
| 5,345,560 A | | 9/1994 | Miura et al. ..................... 711/3 |
| 5,603,004 A | | 2/1997 | Kurpanek et al. ........... 711/118 |
| 5,802,566 A | | 9/1998 | Hagersten .................... 711/137 |
| 5,809,530 A | * | 9/1998 | Samra et al. ................ 711/140 |
| 5,822,616 A | | 10/1998 | Hirooka ......................... 710/27 |
| 5,860,095 A | | 1/1999 | Iacobovici et al. .......... 711/119 |
| 5,958,040 A | * | 9/1999 | Jouppi ......................... 712/207 |
| 6,047,363 A | * | 4/2000 | Lewchuk ..................... 711/213 |
| 6,085,291 A | | 7/2000 | Hicks et al. ................. 711/137 |
| 6,173,392 B1 | * | 1/2001 | Shinozaki ................... 712/207 |
| 6,253,289 B1 | | 6/2001 | Bates, Jr. et al. ........... 711/137 |
| 6,321,301 B1 | | 11/2001 | Lin et al. ..................... 711/137 |
| 6,499,085 B2 | * | 12/2002 | Bogin et al. ................ 711/118 |
| 6,507,892 B1 | * | 1/2003 | Mulla et al. ................ 711/131 |
| 2002/0144062 A1 | | 10/2002 | Nakamura ................... 711/137 |

FOREIGN PATENT DOCUMENTS

| | | |
|---|---|---|
| JP | 7-253926 | 1/1995 |
| JP | 9-190382 | 12/1996 |

* cited by examiner

Primary Examiner—Mano Padmanabhan
Assistant Examiner—Jasmine Song
(74) Attorney, Agent, or Firm—Reed Smith LLP; Stanley P. Fisher, Esq.; Juan Carlos A. Marquez, Esq.

(57) ABSTRACT

Disclosed is a memory system which comprises a first cache memory of a high rank close to a processor; a second cache memory or a main memory device of a lower rank; a first table for storing a line address when there is no line data in the first cache memory at a time of making a transfer request for the line data and the transfer request for the line data is made to the second cache memory or the main memory device; and means for comparing a line address registered in the first table with a line address of a transfer destination every time the transfer request is made. When a result of comparison of the line address in the first table is a miss-hit, the line address of the transfer destination is registered in the first table and it is indicated whether the result of comparison of the line address in the first table is a hit or miss-hit.

11 Claims, 4 Drawing Sheets

MEMORY SYSTEM WITH MECHANISM FOR ASSISTING A CACHE MEMORY

BACKGROUND OF THE INVENTION

The present invention relates to a memory system for a high-performance computer system, and, more particularly, to a cache memory system having a direct mapping structure or a set associative structure which overcomes a problem of thrashing that occurs when multiple data registration requests are made to a specific column in the allocation of data on the cache memory. The invention also relates to a high-performance computer system equipped with a sub memory to reduce the thrashing-originated dropping of the performance.

In a memory system in a high-performance computer system, data transfer from the memory is important in achieving the high performance. A typical way to achieve it is to shorten the delay time in data transfer by using the temporal locality of data. However, an available cache memory is permitted a considerably smaller capacity than the main memory due to the physical restrictions. With regard to the associativity, many cache memories are of a direct mapping system or a 4-way/8-way set associative system.

The direct mapping system allows data to be registered in the single entry in a cache memory separated into a plurality of entries that has a one-to-one association with the address of the data. According to this system, when two pieces of data have data addresses to be registered in the same entry, immediately previous data is casted out of the cache memory, thus lowering the use efficiency. The direct mapping system is, however, simple in mechanism and has a high mounting efficiency.

The full associative system is opposite to the direct mapping system. The full associative system can register data in any entry. While this system has a high use efficiency, it suffers a very low mounting efficiency. The 4-way/8-way set associative system is positioned as an intermediate system between the direct mapping system and the full associative system, and registers data in any one of four entries or eight entries. This system can therefore register up to four pieces or eight pieces of data without casting previous data out of the cache memory. The 4-way/8-way set associative system can be mounted in a smaller area than the full associative system and thus has a higher mounting efficiency.

There is another mechanism, called "victim cache", that also copes with thrashing. The victim cache is a cache which temporarily retains data that has been casted out of the cache memory. When thrashing occurs, data casted out of the cache memory is transferred to the victim cache. Then, the associativity of the cache entries that have caused thrashing becomes the associativity of the cache memory plus the associativity of the victim cache, so that the cache operates as if the associativity became higher. This suppresses the problem of thrashing.

Because data casted out of the cache memory is registered in the victim cache without discriminating whether the data has been casted out due to thrashing or not, however, data to be registered contains unnecessary data or data unrelated to thrashing. This lowers the use efficiency of the victim cache. At the time data on the cache memory is replaced, it is necessary to prepare a path to transfer data to the victim cache for registration as well as to invalidate the original data.

A processor equipped with a cache memory generally employs a cache memory of a set associative system or direct mapping system in order to shorten the time to access to the cache memory or the access latency and to improve the mounting efficiency. In a cache memory with such a low associativity, however, when mapping of a data set larger than the associativity concentrates on the same set, so-called thrashing occurs which causes registered data to be casted out by following data to thereby disable the effective function of the cache memory. When thrashing occurs, data transfer which should have a hit in the cache memory results in a miss-hit so that data should be transferred from the main memory. This may drop the performance of the processor to about one third to one tenth of the performance in the state where there is a hit in the cache memory and data is transferred with a short access latency.

While thrashing may be avoided by adjusting the address of data by inserting dummy data in a sequence of data, it is not easy to detect the occurrence of thrashing and specify the location where thrashing occurs. Thrashing may be prevented by designing the cache memory in a full associative system. But, the complexity of checking a hit in the cache memory inevitably enlarges the hardware, thus increasing the time needed to access the cache and decreasing the mounting efficiency. Because of this disadvantages, the full associative system is not generally employed.

SUMMARY OF THE INVENTION

Accordingly, the invention aims at overcoming the problem of thrashing without requiring large-scale hardware, such as the full associative system, in a cache memory.

According to the invention, means for detecting the occurrence of thrashing is provided between the cache memory and the main memory in order to avoid thrashing without lowering the speed of accessing the cache memory or the mounting efficiency. Another feature of the invention lies in that means for storing thrashing data is provided to suppress the thrashing-originated reduction in the execution speed of a processor.

DETAILED DESCRIPTION OF THE PREFERRED EMBODIMENT

Figure 1:
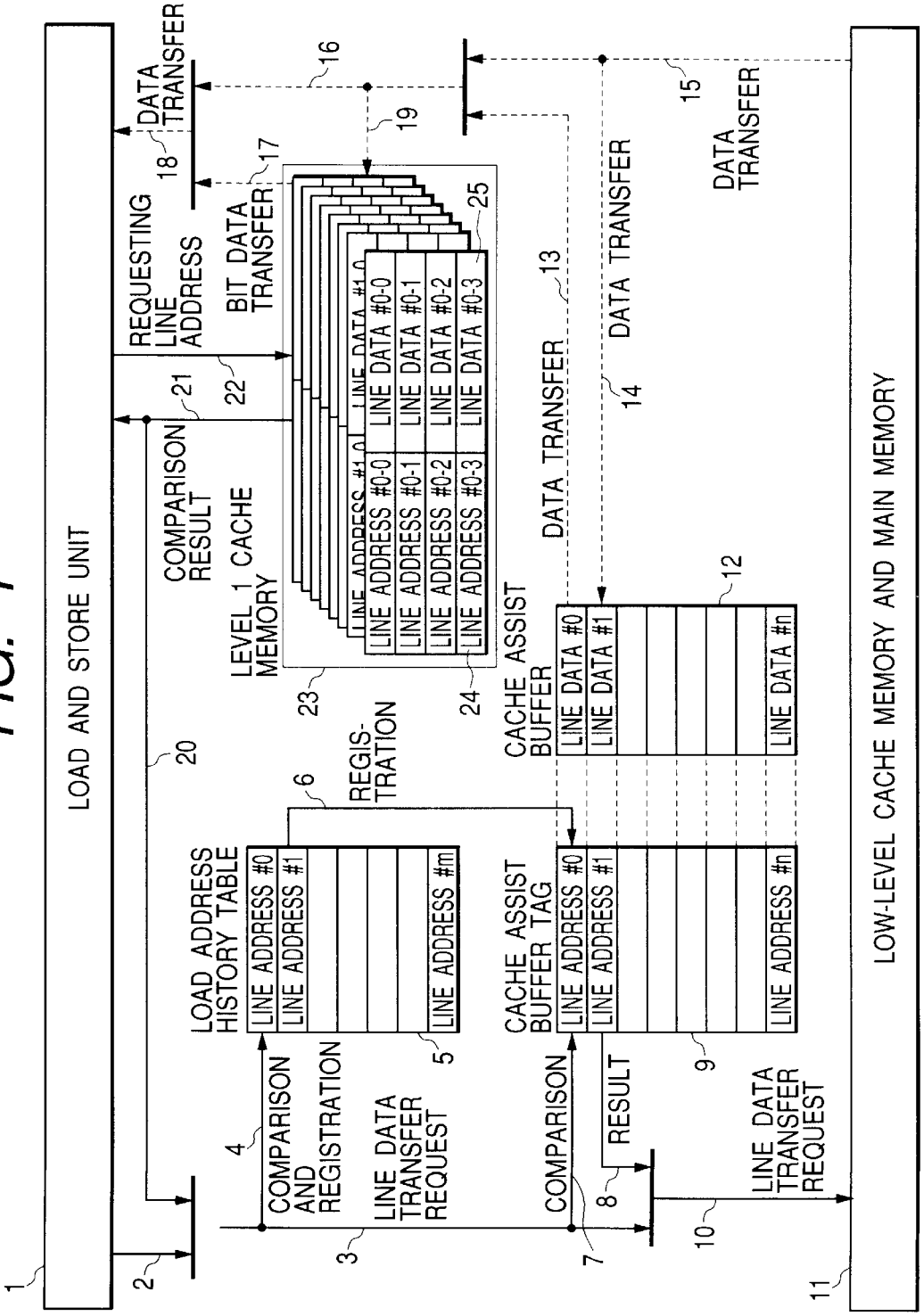
FIG. 1 is a block diagram illustrating the structure of a memory system according to one embodiment of the invention.

FIG. 1 illustrates the structure of a memory system according to one embodiment of the invention. In FIG. 1, an address to request data transfer is sent from a load and store unit 1 to a level 1 cache memory 23 via a line data transfer request path 22. The level 1 cache memory 23 comprises a level-1-cache-memory tag table 24 and a level-1-cache-memory data table 25.

Figure 2:
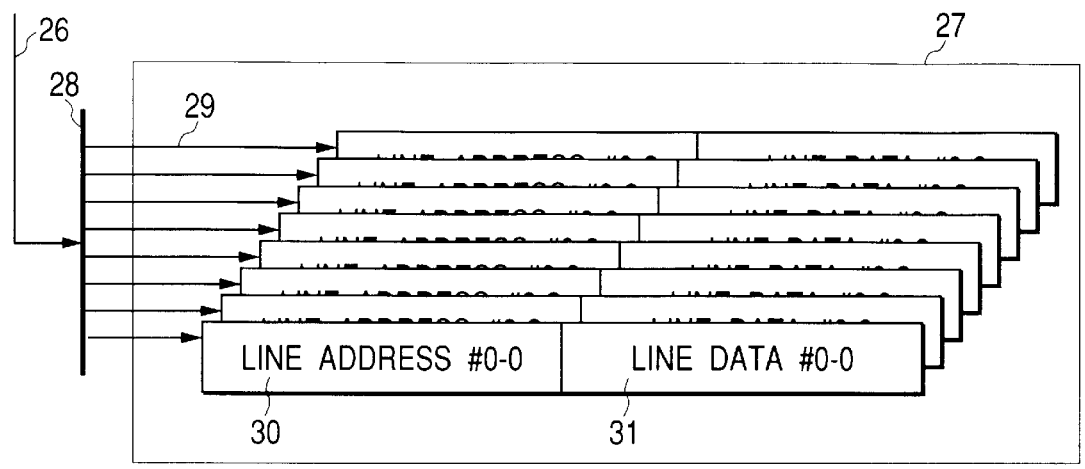
FIG. 2 is a block diagram showing the structure of a cache memory of the direct mapping system.
Figure 3:
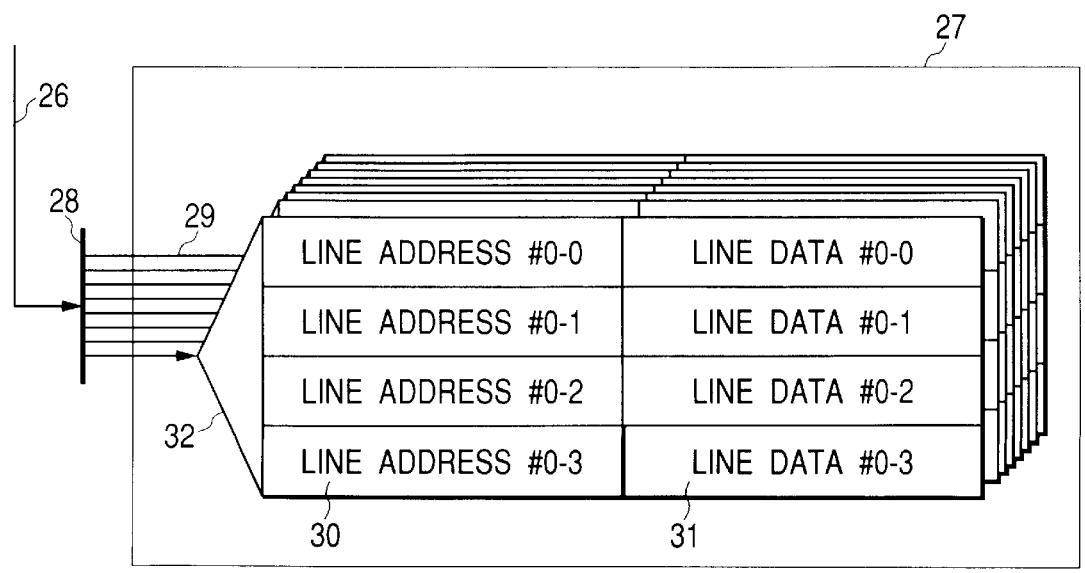
FIG. 3 is a block diagram showing the structure of a cache memory of the 4-way set associative system.
Figure 4:
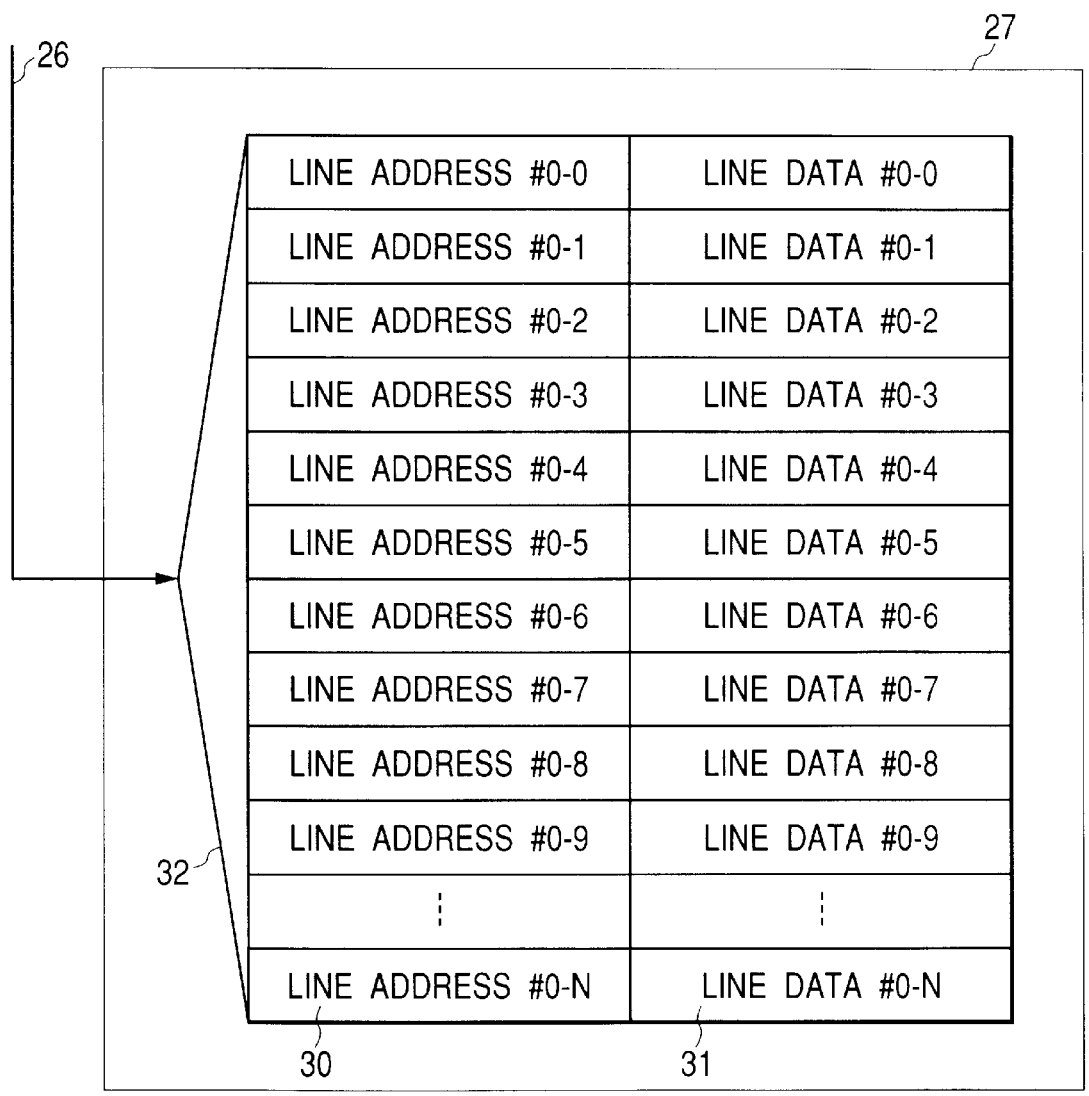
FIG. 4 is a block diagram showing the structure of a cache memory of the full associative system.

The structure of the cache memory generally takes one of systems shown in FIGS. 2 to 4.

FIG. 2 shows a cache memory of the direct mapping system. At the time an access address transferred via a data address path 26 is compared with an address in an address tag table 30 in the cache memory, a set selector 28 selects only one entry that has a one-to-one association with the access address and the access address is compared only with the address of that entry in the address tag table 30. The cache memory of the direct mapping system in FIG. 2 has an associativity of "1".

FIG. 3 shows the structure of a cache memory of the 4-way set associative system. At the time an access address transferred via the data address path 26 is compared with an address in the address tag table 30 in the cache memory, the set selector 28 selects four entries that has a one-to-four association with the access address and the access address is compared with the addresses of the four entries in the address tag table 30. A way selector 32 selects that one in the four entries whose comparison has resulted in a hit. In general, the structure of the cache memory of the n-way set associative system is similar to the one shown in FIG. 3 except that there are n entries included in one set. The cache memory of the n-way set associative system has an associativity of "n".

FIG. 4 shows the structure of a cache memory of the full associative system. At the time an access address transferred via the data address path 26 is compared with an address in the address tag table 30 in the cache memory, the access address is compared with the addresses of all the entries in the address tag table 30 and the way selector 32 selects that one in the entries whose comparison has resulted in a hit.

The invention has a cache memory of the direct mapping system or n-way set associative system as a level 1 cache memory and detects thrashing which is the overflow of data from the cache memory when a specific set in the cache memory is used within a given by pieces of line data the number of which is greater than the associativity of the cache memory. The invention also has a mechanism which reduces thrashing to be detected.

The request of access to data that has been casted out of the level 1 cache memory 23 by thrashing results in a miss-hit in the comparison with data in the level-1-cache-memory tag table 24, and miss-hit information is sent via level-1-cache-memory hit result paths 20 and 21. Based on the miss-hit information, the line data transfer request is transferred to a low-level cache memory and main memory 11 through line-data transfer request paths 2, 3 and 10. During the transfer, a line address registered in a load address history table 5 is compared with a transfer destination address via a line-data transfer request path 4.

The load address history table 5 operates as follows.
(1) When the line address that matches with the address sent via the line-data transfer request path 4 is not in the load address history table 5, that line address is registered in the table 5.
(2) When the line address that matches with the address sent via the line-data transfer request path 4 is in the load address history table 5, the associated line in the table 5 is invalidated and its line address is output on a hit-line-address transfer path 6.

The load address history table 5 in which m entries are provided is designed in a full associative structure. The load address history table 5 may be designed in an m-way set associative structure. The following description is given on the assumption that the table 5 has the m-way set associative structure.

When the line address is registered in the load address history table 5 in the above-described operation with respect to the line data transfer request output from the load and store unit 1, it means that the line data transfer request has been made recently so that it is possible to detect that a miss-hit has occurred in the level 1 cache memory 23. The generation of such a line data transfer request is the peculiar behavior that is seen when thrashing has occurred in the level 1 cache memory 23, and the output of a line address to the hit-line-address transfer path 6 means that the occurrence of thrashing is detected and the line address that has caused thrashing has been specified.

Assuming that the number of lines that has caused thrashing is "1", thrashing is detectable by using the m-entry load address history table 5 within the range where a transfer request for thrashing data is included in m or less line data transfer requests consecutively output from the load and store unit 1. If all the line data transfer requests are transfer requests for thrashing data, thrashing is detectable by using the m-entry load address history table 5 within the range where the number of lines that have caused thrashing is m or smaller.

There are three types of transfer requests that are output to the line-data transfer request path 2 from the load and store unit 1. The first one is a transfer request made by a load command originated from a miss-hit in the level 1 cache memory 23. The second one is a prefetch command or the like which previously registers data in the level 1 cache memory 23 or a register. The last one is a transfer request made by a store command. Of the three types of transfer requests, the transfer request based on the load command originated from a miss-hit in the level 1 cache memory 23 is the only type that is registered in the load address history table 5. The prefetch-based line data transfer request is not registered in the load address history table 5 for the possibility of reducing the use efficiency of the table 5.

The targets in the comparison of a line address in the load address history table 5 with the line address in the line data transfer request are the line data transfer request for prefetching or the like that registers data in the level 1 cache memory 23 or the register beforehand as well as the line data transfer request based on the load command originated from a miss-hit in the level 1 cache memory 23. This can reduce the thrashing-originated decrease in the performance for prefetching of the line that has caused thrashing.

A cache assist buffer tag 9 is a table which holds n line addresses in a manner similar to the address retaining manner of the load address history table 5. Those line addresses correspond to line data registered in a cache assist buffer 12. The cache assist buffer tag 9 is designed in an n-entry full associative structure. The cache assist buffer tag 9 may be designed in an n-way set associative structure. The following description is given on the assumption that the tag 9 has the n-entry full associative structure.

The cache assist buffer tag 9 has two inputs, namely the hit-line-address transfer path 6 from the load address history table 5 and a path 7 which acquires, along the way, a transfer request sent via the line-data transfer request paths 2 and 3 from the load and store unit 1. The cache assist buffer tag 9 has a cache-assist-buffer hit result path 8 as its output. The tag 9 operates as follows.
(1) When a line address has been transferred via the hit-line-address transfer path 6 from the load address history table 5, the line address is registered in the cache assist buffer tag 9. The new registration of that line address is notified via the cache-assist-buffer hit result path and the line transfer request in the path 10 becomes a flagged line data transfer request.
(2) When the line address that matches with the line address in the line data transfer request transferred via the path 7 is in the entry of the cache assist buffer tag 9, it means that the associated line data is present in the cache assist buffer 12 and the state of the associated entry in the cache assist buffer tag 9 remains unchanged.

(3) The result that shows whether the line address whose transfer request has been made to the cache assist buffer tag 9 is a hit or a miss-hit is transferred onto the cache-assist-buffer assist-buffer hit result path 8.

The contents of the transfer request to the line-data transfer request path 10 change as follows in accordance with the information that is output from the cache-assist-buffer hit result path 8.

(1) When information on the line address that is newly registered in the cache assist buffer tag 9 goes on the cache-assist-buffer hit result path 8, the contents of the transfer request to the line-data transfer request path 10 become a line data transfer request to be registered in the cache assist buffer 12. The line data is transferred to the cache assist buffer 12 as indicated by dotted lines 15 and 14 and stored therein.

(2) When hit information on the line address whose transfer to the cache assist buffer tag 9 has been requested goes on the cache-assist-buffer hit result path 8, the associated line data is returned directly from the cache assist buffer 12 as indicated by a dotted line 13, thereby preventing a transfer request to the line-data transfer request path 10.

The above-described operation can transfer line data which has caused thrashing from the cache assist buffer 12 that is a layer between the level 1 cache memory 23 and the low-level cache memory and main memory 11, not from the low-level cache memory and main memory 11 which involves a long delay time. This can speed up the line data transfer.

The data transfer from the low-level cache memory and main memory 11 is carried out via data transfer paths 14 to 19. The data that is identified as line data to be registered in the cache assist buffer 12 via the line-data transfer request path 10 is registered in the buffer 12. There are two ways to detect the identification: one is to place flagged data on the data transfer path 15 and the other is to place on the data transfer path 15 only identifiers each of which can specifically identify associated data to be transferred and select, in the cache assist buffer 12, data to be registered in the buffer 12 based on the identifiers.

The cache assist buffer 12, which registers line data, is associated one-to-one with the cache assist buffer tag 9 and has the same structure as the tag 9. That is, when the cache assist buffer tag 9 has an n-entry full associative structure, the cache assist buffer 12 also has an n-entry full associative structure.

When the cache assist buffer tag 9 has an entry which has a hit in the comparison with the line address for the line data transfer request, data is transferred from the associated line of the cache assist buffer 12 to the level 1 cache memory 23 and the load and store unit 1 via the data transfer path 13.

Although the embodiment is provided with the cache assist buffer 12 for storing the line data that has caused thrashing, thrashing can be coped with in another manner as long as thrashing can be detected. Rules of addressing the level 1 cache memory 23 which define the association of the set address of a line to be cached with a column in the cache memory 23 where actual storage takes place may be changed to addressing with a Hash function from linear addressing, thereby suppressing thrashing.

Figure 5:
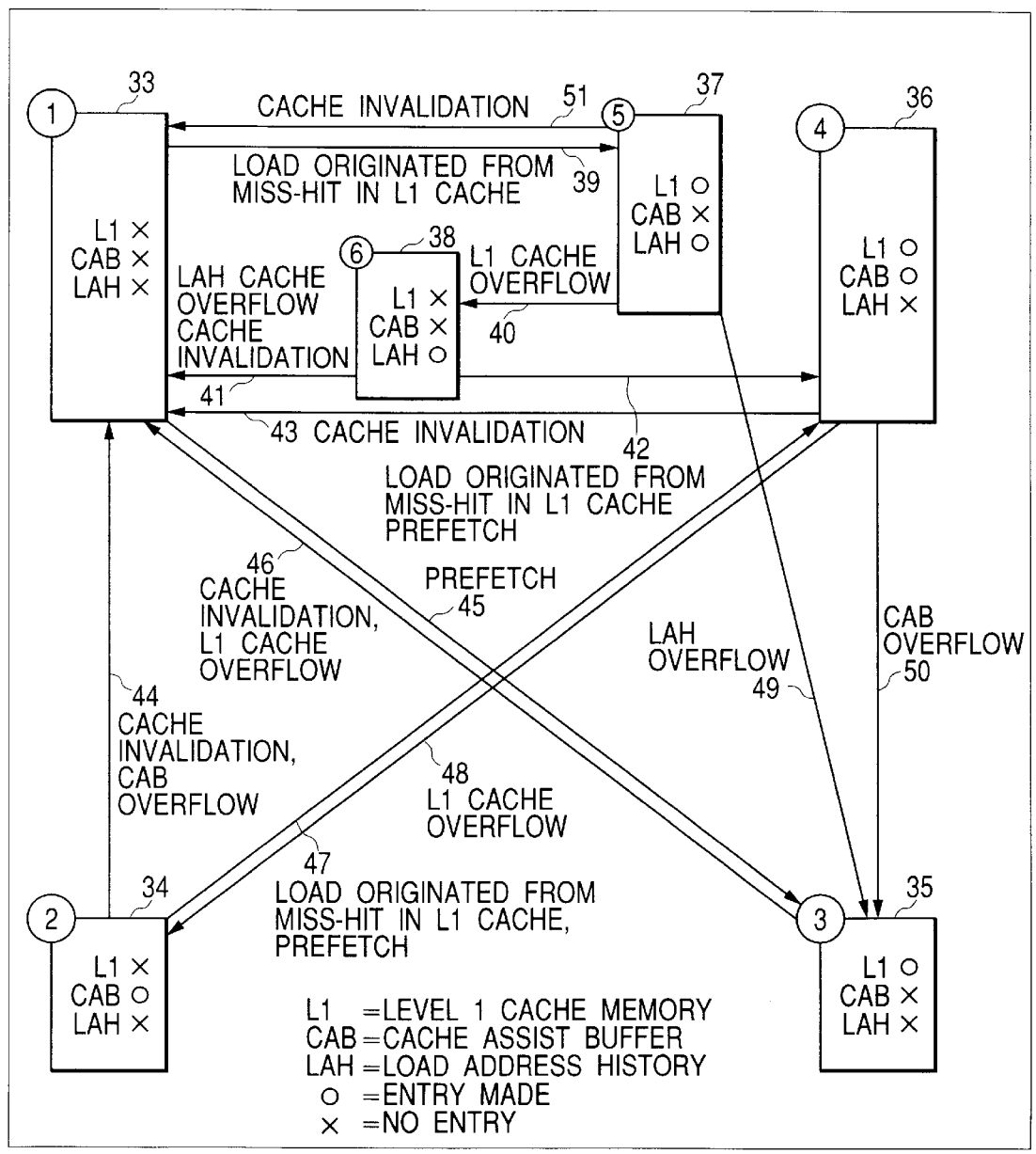
FIG. 5 is a diagram of state transition for explaining the operation of the invention.

FIG. 5 is a diagram of state transition of the level 1 cache memory 23, the cache assist buffer 12 and the load address history table 5 according to the invention. Referring to FIG. 5, the level 1 cache memory 23 is abbreviated to "L1", the cache assist buffer 12 to "CAB" (Cache Assist Buffer), and the load address history table 5 to "LAH" (Load Address History).

A state 1(33) is the initial state where every entry has neither associated line data nor an associated line address. When line data transfer happens in the state 1(33) in response to a load command originated from a miss-hit in the level 1 cache memory 23, a state transition (39) changes the state to a state 5(37). That is, the associated line address is registered in the load address history table 5 and the associated line data is transferred to and registered in the level 1 cache memory 23.

When the associated entry in the level 1 cache memory 23 is overwritten with other data in a state 5(37), overflow of the level 1 cache memory 23 occurs and a state transition (40) changes the state to a state 6(38). It is also this state transition (40) in which thrashing casts data out of the level 1 cache memory 23.

When line data transfer happens in the state 6(38) in response to a load command originated from a miss-hit in the level 1 cache memory 23 or prefetching, a state transition (42) changes the state to a state 4(36). The state transition here means the state transition in which the line address for the line data transfer request has a hit in the load address history table 5, the associated line address is registered in the cache assist buffer tag 9 via the hit-line-address transfer path 6, the transfer request that flows on the line-data transfer request path 10 is marked to indicate registration of line data in the cache assist buffed 12 and line data from the low-level cache memory and main memory 11 is registered in the cache assist buffed 12 via the data transfer paths 15 and 14, and the state transition in which line data from the low-level cache memory and main memory 11 is registered in the level 1 cache memory 23 via the data transfer paths 15, 16 and 19 through the same process as done in the former state transition.

When the associated entry in the level 1 cache memory 23 is overwritten with other data in a state 4(36), overflow of the level 1 cache memory 23 occurs and a state transition (48) changes the state to a state 2(34). It is also this state transition (48) in which thrashing casts data out of the level 1 cache memory 23.

While line data has disappeared from the level 1 cache memory 23 in the state 2(34), line data remains on the cache assist buffer 12. When line data transfer happens in the state 2(34) in response to a load command originated from a miss-hit in the level 1 cache memory 23 or prefetching, a state transition (47) changes the state to the state 4(36).

The state transition (47) is a typical example of assisting a thrashing-originated miss-hit in the level 1 cache memory 23 with the cache assist buffer 12. When the same thrashing is repeated, a state transition (47, 48) takes place between the state 2(34) and the state 4(36).

Without the mechanism of the invention, the state 2(34) becomes the state 1(33) and data is transferred from the low-level cache memory and main memory 11 every time a load command is issued. This thrashing state significantly lowers the performance.

Specifically, when a prefetch-originated line data transfer request is made in the state 1(33), a state transition (45) changes the state to a state 3(35). Line data and a line address are not registered in the load address history table 5 and the cache assist buffer 12 respectively in the state 3(35). When the associated entry in the level 1 cache memory 23 is overwritten with other data, therefore, overflow of the level 1 cache memory 23 occurs and a state transition (46)

changes the state to the state 1(33). It is also this state transition (46) in which thrashing forces data out of the level 1 cache memory 23.

The state transition (46) also takes place when cache invalidation occurs. When the associated entry in the cache assist buffer 12 is overwritten with other line data in the state 2(34), a state transition (44) changes the state to the state 1(33). This occurs when thrashing data larger than the associativity of the cache assist buffer 12 is registered in the buffer 12.

The state transition (44) also takes place when cache invalidation occurs. When the associated entry in the cache assist buffer 12 is overwritten with other line data in the state 4(36), a state transition (50) changes the state to the state 3(35). In case of cache invalidation, a state transition (43) changes the state to the state 1(33).

When the associated entry in the load address history table 5 is overwritten with another line address in the state 5(37), a state transition (49) changes the state to the state 3(35). This occurs when a line data transfer request is made by a load command originated from miss-hits in the level 1 cache memory 23 whose quantity exceeds the number of entries in the load address history table 5. In case of cache invalidation, a state transition (51) changes the state to the state 1(33).

When the associated entry in the load address history table 5 is overwritten with another line address in the state 6(38), a state transition (41) changes the state to the state 1(33). In case of cache invalidation, the state transition (41) also changes the state to the state 1(33).

The invention has an advantage in suppressing the lowering of the processor performance that is caused by thrashing which occurs in a cache memory of the set associative system or the direct mapping system. The characteristic effect of the invention is the capability of suppressing the occurrence of thrashing without lowering the accessibility of the cache memory or the mounting efficiency because of no special mechanism provided in the cache memory itself.

The use efficiency of the buffer which registers thrashing data for suppressing thrashing can be enhanced by selecting thrashing data and registering that data in the buffer. For the purpose of suppressing thrashing to the same degree, the buffer capacity can be made smaller. Provided that buffers of the same capacity are used, the use of the buffer according to the invention can considerably suppress the occurrence of thrashing as compared with the related art, so that the memory system of the invention can lead to a higher mounting efficiency against the improvement of the performance.

What is claimed is:

1. A memory system comprising:
   a first cache memory of a high rank close to a processor;
   a second cache memory or a main memory device of a lower rank;
   a first table for registering a least one line address of a previous transfer request for line data, the previous transfer request for said line data being made to said second cache memory or said main memory device when the line data is not available in said first cache memory;
   first means for comparing the line address registered in said first table with a line address of a new transfer request for line data, the new transfer request for said line data being made to said second cache memory or said main memory device when the line data is not available in said first cache memory;
   a first buffer for storing thrashing line data, which is transferred from said second cache memory or said main memory device due to thrashing, in a part of said second line memory or main memory device;
   a second table for registering at least one corresponding trashing line address to the thrashing line data to be stored in said first buffer;
   second means for comparing said line address of said new transfer request for line data with said thrashing line address in said second table at a time of making the transfer request for the thrashing line data;
   means for registering said line address of said new transfer request in said second table with respect to said flagged line data transfer request;
   means for storing line data in said first buffer when said thrashing line address has been registered in said second table during transferring the thrashing line data from said main memory device or said second cache memory; and
   means for transferring the thrashing line data to a transfer requester from said first buffer when a result generated by the second means for comparing is a hit,
   Wherein a result generated by the first means for comparing is either a hit or a mishit, and when the result is a miss-hit, said line address of said new transfer request is registered in said first table, and
   a flagged line data transfer request having a flag indicating the result being a hit is generated.

2. The memory system according to claim 1, wherein the result is a hit, it is indicated that thrashing is taking place.

3. The memory system according to claim 2, wherein said first cache memory is provided outside a processor.

4. The memory system according to claim 2, wherein said first cache memory is provided in a processor.

5. The memory system according to any one of claim 2, wherein rules of addressing said first cache memory is changed when it is determined that thrashing is taking place.

6. The memory system according to claim 1, wherein said first cache memory is provided outside a processor.

7. The memory system according to claim 1, wherein said first cache memory is provided in a processor.

8. The memory system according to claim 1, wherein rules of addressing said first cache memory is changed when it is determined that thrashing is taking place.

9. A memory system comprising:
   a load and store unit;
   a first memory, which is connected to said load and store unit, for storing at least one line address and corresponding line data;
   a second memory, with a predetermined associativity, which is connected to said load and store unit at a location closer to said load and store unit than said first memory, for storing at least one line address and corresponding line data previously requested and transferred from the first memory to the load and store unit; and
   a third memory with an associativity higher than said associativity of said second memory, which is connected to said load and store unit and provided between said first memory and said second memory, for storing at least one thrashing line address and corresponding thrashing line data which are not present in said second memory due to thrashing even after a plurality of transfer requests for a line address of line data currently requested have been made to said first memory, wherein
   the thrashing line data stored in said third memory is transferred to said load and store unit on demand.

10. The memory system according to claim 9, wherein when said second memory has a direct mapping structure or a set associative structure.

11. A memory system comprising:
   a load and store unit;
   a first memory, which is connected to said load and store unit, for storing at least one line address and corresponding line data;
   a second memory, which is connected to said load and store unit at a location closer thereto than said memory, having direct mapping structure or a set associative structure and storing at least one line address and corresponding line data previously requested and transferred from the first memory to the load and stored unit;
   means for detecting occurrence of thrashing in said second memory; and
   a third memory, which is connected to said load and store unit and provided between said first memory and said second memory, for storing at least one thrashing line address and corresponding thrashing line data which is detected as thrashing by said means for detecting and transferred from said first memory in said second memory, wherein
   that line data which has caused said thrashing is transferred to said load and store unit form said third memory on demand.

* * * * *